(12) United States Patent
Haamer

(10) Patent No.: US 6,844,534 B2
(45) Date of Patent: Jan. 18, 2005

(54) PROCESS FOR MICROWAVE COOKING AND VACUUM PACKING OF FOOD

(75) Inventor: Joel Haamer, Nösund (SE)

(73) Assignee: MicVac AB, Göteborg (SE)

( * ) Notice: Subject to any disclaimer, the term of this patent is extended or adjusted under 35 U.S.C. 154(b) by 179 days.

(21) Appl. No.: 10/190,829

(22) Filed: Jul. 9, 2002

(65) Prior Publication Data
US 2003/0017238 A1 Jan. 23, 2003

Related U.S. Application Data

(63) Continuation-in-part of application No. 09/719,988, filed as application No. PCT/SE99/00974 on Jun. 14, 1999, now Pat. No. 6,437,305.

(30) Foreign Application Priority Data
Jun. 23, 1998 (SE) .............................................. 9802212

(51) Int. Cl.[7] .............................................. H05B 6/78
(52) U.S. Cl. ........................ 219/700; 219/735; 426/118; 426/243
(58) Field of Search ................................ 219/725, 734, 219/735, 762, 686, 700, 701; 426/118, 234, 107, 113, 241, 243; 99/DIG. 14

(56) References Cited

U.S. PATENT DOCUMENTS

| | | | |
|---|---|---|---|
| 3,427,171 A | * | 2/1969 | Jeppson ...................... 426/241 |
| 3,637,132 A | | 1/1972 | Gray |
| 3,718,082 A | * | 2/1973 | Lipoma ...................... 219/700 |
| 4,490,597 A | * | 12/1984 | Mengel ...................... 219/735 |
| 4,797,010 A | | 1/1989 | Coehlo |
| 4,933,193 A | | 6/1990 | Fisher |
| 5,041,325 A | * | 8/1991 | Larson et al. ............... 219/735 |
| 5,464,969 A | | 11/1995 | Miller |
| 5,750,967 A | | 5/1998 | Sprauer, Jr. |
| 5,827,554 A | | 10/1998 | Guarino |
| 5,974,686 A | | 11/1999 | Nomura et al. |
| 6,437,305 B1 | * | 8/2002 | Haamer ...................... 219/735 |

FOREIGN PATENT DOCUMENTS

| | | |
|---|---|---|
| EP | 0 094 362 A1 | 11/1983 |
| EP | 0 174 188 A2 | 3/1986 |
| EP | 0 242 183 A1 | 10/1987 |
| EP | 0 721 743 A1 | 7/1996 |
| GB | 1 550 000 A2D | 8/1979 |
| JP | 1-240475 A | 9/1989 |

OTHER PUBLICATIONS

International Search Report for PCT/SE99/00974, dated Jun. 23, 1998.
International Preliminary Examination Report for PCT/SE99/00974, dated Oct. 13, 2000.

* cited by examiner

Primary Examiner—Philip H. Leung
(74) Attorney, Agent, or Firm—Burns, Doane, Swecker & Mathis, L.L.P.

(57) ABSTRACT

A method for the cooking and vacuum packing of food includes placing food that is to be cooked and vacuum packed inside a container; passing the container into a microwave tunnel which is suitable for the application of microwave energy to the container and food for the heating and cooking of the food inside the container; subjecting the container containing the food to microwave energy to heat the food; and ceasing the application of microwave energy such that the venting opening closes and, as the container cools, steam therein condenses, whereupon a vacuum arises inside the container. The cooking and vacuum packing take place in the same operation in the container and the container is flexible such that it molds itself to its contents when a vacuum arises in the container.

17 Claims, 3 Drawing Sheets

PROCESS FOR MICROWAVE COOKING AND VACUUM PACKING OF FOOD

CROSS REFERENCE TO RELATED APPLICATIONS

This application is a continuation-in-part of U.S. application Ser. No. 09/719,988, filed Jan. 23, 2001, now, U.S. Pat. No. 6,437,305 which claims the benefit of priority under 35 U.S.C. §119 of Application No. 9802212-2, filed in Sweden on Jun. 23, 1998, and which is a 35 U.S.C. §371 filing of International Application No. PCT/SE99/00974, filed Jun. 14, 1999, that was published in English on Jan. 27, 2000, all being incorporated herein by reference.

BACKGROUND OF THE INVENTION

1. Field of the Invention

The invention relates to a method and device for the cooking and vacuum packing of food by the use of microwaves, such that said food can be stored as chilled or frozen goods.

2. Background Information

Generally, all kinds of food that don't require browning, e.g., using a frying pan, can be cooked in microwave ovens. This is common knowledge today, and can be seen in the multiple microwave cook books available on the market. See for example "*Easy cooking for today*", Martin, Pol., Brimar Publ. Inc., 1995, Montreal. However, foods that require browning can initially be browned in a traditional way and thereafter cooked in a microwave oven.

"Microwave and radio frequency heating for pasteurization and sterilization are preferred to the conventional heating for the primary reason that they are rapid and therefore require less time to come up to the desired process temperature. This is particularly true for solid and semi-solid foods that depend on the slow thermal diffusion process in conventional heating. They can approach the benefits of high temperature-short time processing whereby bacterial destruction is achieved, but thermal degradation of the desired components is reduced. Industrial microwave pasteurization and sterilization systems have been reported on and off for over 30 years Studies with implications for commercial pasteurization and sterilization have also appeared for many years. As of this writing, 2 commercial systems worldwide could be located that currently perform microwave pasteurization and/or sterilization of foods (in the year 2000). Though continuous microwave heating in a tube flow arrangement has been studied at the research level, no commercial system is known to exist for food processing." (*U.S. Food and Drug Administration, Center for Food Safety and Applied Nutrition, Jun. 2, 2000. Kinetics of Microbial Inactivation for Alternative Food Processing Technologies. Microwave and Radio Frequency Processing.*)

The known commercial systems are Tops in Belgium and Akiyama in Japan where the former uses a non-continuous pressurized tunnel for sterilization of ready meals in closed plastic trays. The over-pressure in the sterilization tunnel prevents the plastic trays from exploding when the temperature inside the trays exceeds 100° C.

As the foregoing FDA article points out, there are advantages of microwave technology in food processing, but still there are very few industries in the world using this technology because it is complicated and expensive.

SUMMARY OF THE INVENTION

The purpose of the present invention is to make it possible to use microwave technology for cooking and pasteurization of food in a continuous process in an open microwave tunnel with no over-pressure. This is achieved when the food is processed in a flexible plastic container with a venting opening which is opened automatically when the product in the package starts to boil and closed automatically when the boiling ceases. Any kind of foods that do not require browning can be directly processed with the method according to the present invention. Foods that require browning can initially be pre-browned by exposure to a heat source and then processed with the method according to the present invention. The final result is a cooked, pasteurized and vacuum packed product.

The invention was first evaluated with mussels that need to be cooked in a very special way: the best texture of mussel meat is achieved if the mussels are heated very quickly. For commercial processing usually retort cookers are used and the mussels are steamed in thin layers with hot steam in over-pressure. These cookers are of the same type as those used in sterilization processes, complicated and non-continuous. When microwave heating was tried for mussel cooking, the same quick heating was achieved as with steam with the same good texture of the mussel meat.

As mussels are very difficult to process (cook) it can be said that if a method is capable of processing mussels, the method can be used for any kind of food. The problems of processing other sensitive primers, such as new potatoes or asparagus, with very short time of top quality, are very similar to the problems with mussels. Many of these primers can be preserved with the same technique.

According to the present invention, a method is provided for the cooking and vacuum packing of food in a continuous process, comprising heating food in a container, wherein the container is provided with a venting opening for the release of over-pressure during boiling. Microwave energy may be used to heat and cook the food, resulting in steam being formed inside the container. Excess steam and air may exit through the venting opening, which is sealed manually or automatically when the input of microwave energy is ceased. As the container cools, steam therein condenses, whereupon a vacuum arises inside the container. Due to the use of a flexible container, the container molds itself to its contents as the vacuum arises in the container.

As one aspect of the invention, a continuous process for the cooking and vacuum packing of food is provided, comprising, placing food that is to be cooked and vacuum packed inside a container, wherein said container is provided with a venting opening for the release of overpressure during boiling;

passing the container into a microwave tunnel which is suitable for the application of microwave energy to said container and food for the heating and cooking of the food inside the container, subjecting the container containing the food to microwave energy to heat the food; and ceasing the application of microwave energy such that the venting opening closes and, as the container cools, steam therein condenses, whereupon a vacuum arises inside the container;

wherein, said cooking and vacuum packing take place in the same operation in the container wherein the food remains during subsequent storage.

DETAILED DESCRIPTION OF THE PREFERRED EMBODIMENTS

Figure 1A:
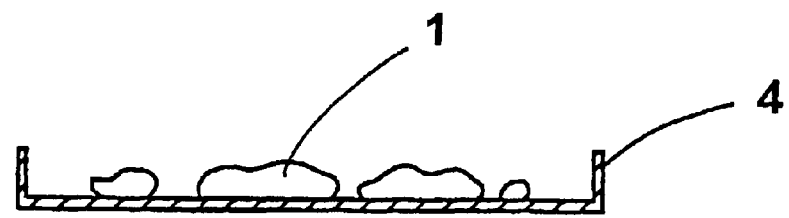
FIGS. 1A to 1E schematically illustrate a method of packaging, cooking and vacuum packing food.
Figure 1B:
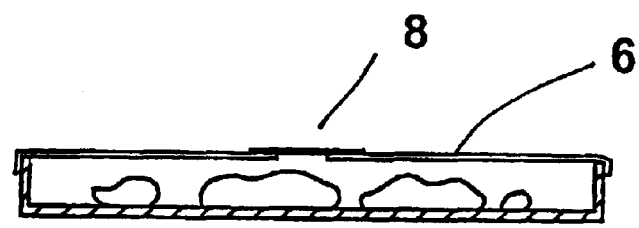
Figure 1C:
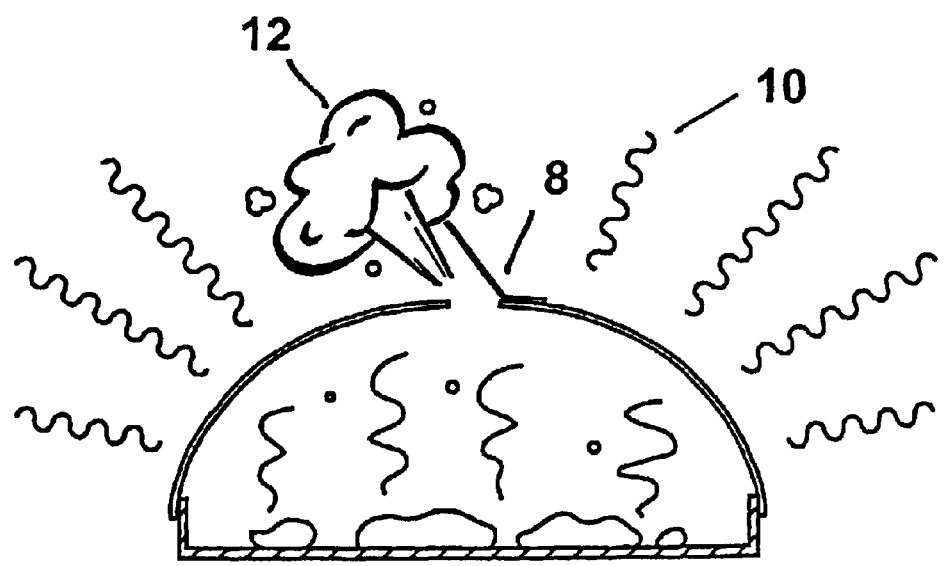
Figure 1D:
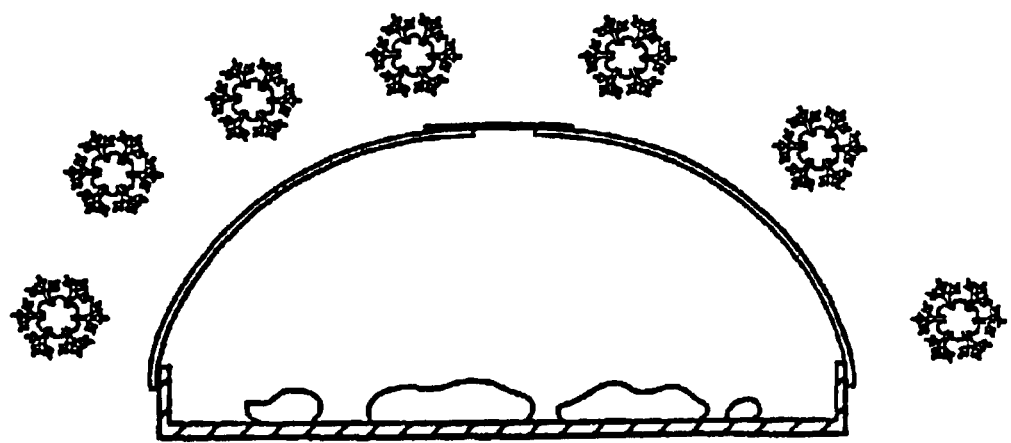
Figure 1E:

One embodiment of a microwaveable container and process for the packaging, cooking and vacuum packing of food by the use of microwaves is illustrated in FIGS. 1A to 1E of the drawings. In FIG. 1A, food 1 may be placed in a flexible container 4, such as a plastic tray. The container may then be covered with a material 6, as shown in FIG. 1B, that can withstand microwave heating and frozen storage and is tough enough to be suitable for vacuum packing. The covering for the container may be, e.g., a lid or film having a venting opening 8. Upon the application of microwave energy 10 to the container and the food inside the container (FIG. 1C), the food is heated and cooked. Steam and air 12 resulting from the heating process escape through the venting opening 8. Cessation of heating by microwave energy leads to cooling and the closing of the venting opening, as depicted in FIG. 1D. As steam condenses during the cooling process, a vacuum arises. The flexible container molds itself at least to some degree to the contents of the container, as illustrated in FIG. 1E, thereby producing a vacuum packed food container.

Figure 2:
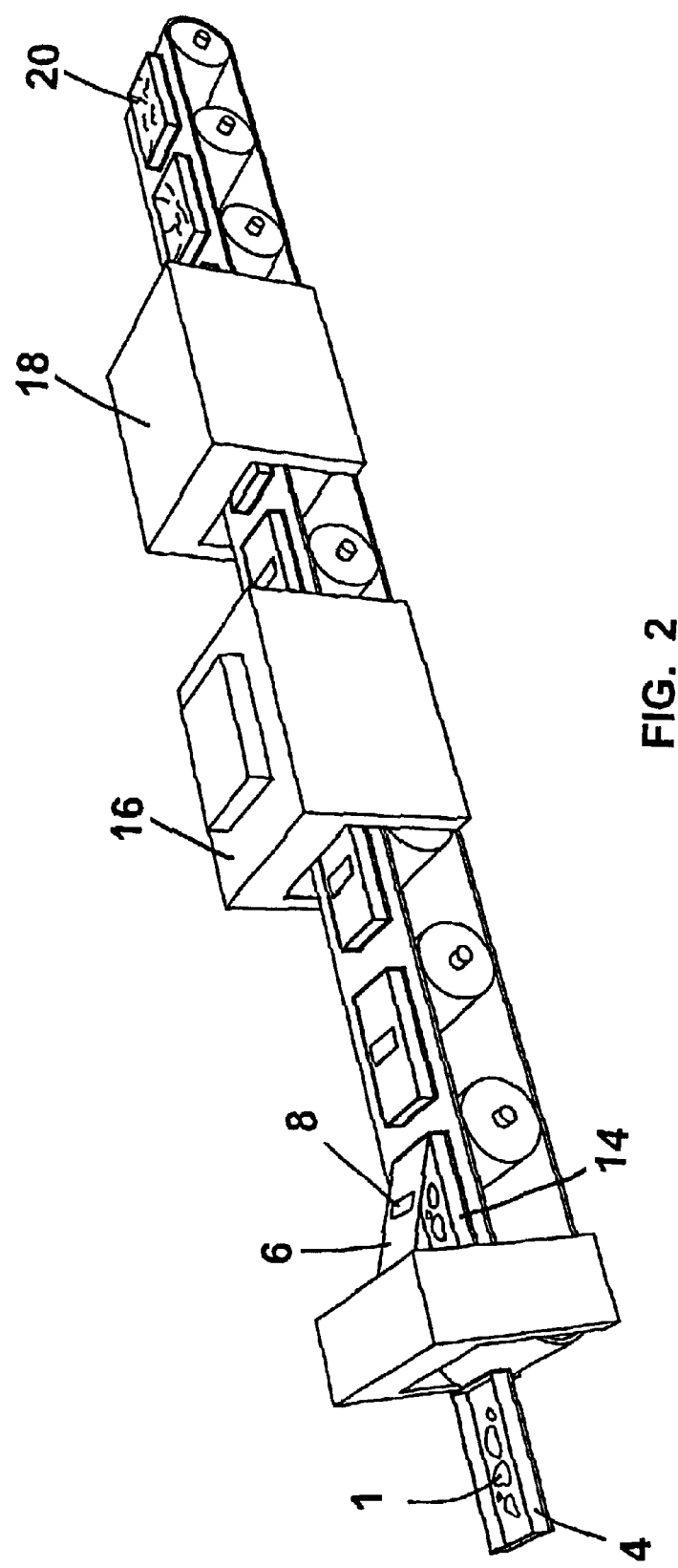
FIG. 2 schematically illustrates a continuous process and manufacturing apparatus for packaging, cooking and vacuum packing food.

FIG. 2 illustrates a continuous (industrial) process for packaging, cooking using a microwave tunnel and vacuum packing food. As shown, food 1 is placed in a container 4. A cover 6 having a venting opening 8 is placed over the container 14. The covered container is then passed through a microwave tunnel 16 during which the food is heated and cooked. The container is next cooled 18 such that the container molds itself at least to some degree around the contents of the container, thereby producing a vacuum packed food container 20.

The container is not limited to particular materials or types or forms of containers. Any material and shape or size of container may be used provided it is capable of withstanding microwave cooking, chilling and freezing without bursting. The shape and size of the container is determined by the requirement that the temperature at every point inside the container be raised to the boiling point by means of microwaves together with thermal conduction within approximately four minutes. Suitable forms of containers include trays, bags or cans. Plastic materials may also be suitably used for such containers.

On the upper side of the container there is an opening (diameter approx. 5 mm) which permits the escape of air and steam when the product inside the container is brought to the boil. When the input of microwave energy has ceased, the opening is sealed and the steam begins to condense inside the container. During condensation a vacuum arises and the container must be flexible enough to mold itself to its contents to some degree.

The present invention is also not intended to be limited to a particular form or type of food. While the process may be utilized to prepare mussels or other seafood as noted above, other foods, such as in the form of ready-to-eat meals, may be prepared.

While the invention has been described in terms of preferred embodiments, the skilled artisan will appreciate that various modifications, substitutions, omissions and changes may be made without departing from the spirit thereof Accordingly, it is intended that the scope of the present invention be limited solely by the scope of the following claims, including equivalents thereof.

What is claimed is:

1. A method for the cooking and vacuum packing of food comprising, placing food that is to be cooked and vacuum packed inside a container, wherein said container is provided with a venting opening for the release of overpressure during boiling;

passing the container into a microwave tunnel which is suitable for the application of microwave energy to said container and food for the heating and cooking of the food inside the container, subjecting the container containing the food to microwave energy to heat the food; and ceasing the application of microwave energy such that the venting opening closes and, as the container cools, steam therein condenses, whereupon a vacuum arises inside the container;

wherein said cooking and vacuum packing take place in the same operation in the container wherein the food remains during subsequent storage; and wherein the container is flexible and molds itself to its contents when a vacuum arises in the container as steam condenses due to cooling of the container following cessation of microwave heating.

2. A process according to claim 1, wherein said process is a continuous industrial process.

3. A process according to claim 1, wherein the container containing the food is in the form of a ready-to-eat meal.

4. A process according to claim 1, wherein the food is prebrowned by exposure of the food to a heat source prior to placing the food in the container.

5. A process according to claim 1, wherein a venting opening is provided on the top side of the container through which air and steam can escape during boiling, and said venting opening is capable of being sealed manually or automatically.

6. A process according to claim 5, wherein the venting opening is capable of being sealed by means of self-adhesive tape as soon as boiling ceases.

7. A process according to claim 5, wherein said venting opening comprises self-adhesive tape which acts to seal the container as soon as boiling ceases.

8. A process according to claim 1, wherein the container molds itself to its contents such that the space for spillage inside the container is minimized.

9. A process according to claim 1, further comprising, after placing the food that is to be cooked and vacuum packed inside the container, covering the food with a material that can withstand microwave heating and frozen storage, and which is suitable for vacuum packing.

10. A process according to claim 9, wherein the material covering the food is a plastic material.

11. A process according to claim 9, wherein the material covering the food has a venting opening.

12. A process according to claim 11, wherein the venting opening is provided on the top side of the container through which air and steam can escape during boiling, and said venting opening is capable of being sealed manually or automatically.

13. A process according to claim 11, wherein said venting opening is capable of being sealed by means of self-adhesive tape as soon as boiling ceases.

14. A process according to claim 11, wherein said venting opening comprises self-adhesive tape which acts to seal the container as soon as boiling ceases.

15. A process according to claim 1, wherein the container is a plastic can.

16. A process according to claim 1, wherein the container is a plastic bag.

17. A process according to claim 1, wherein the container is a plastic tray.

* * * * *